Sept. 15, 1953     W. B. SNOOK ET AL     2,652,498
APPARATUS FOR RAPID X-RAY EXPOSURES
Filed Jan. 13, 1949     5 Sheets-Sheet 2
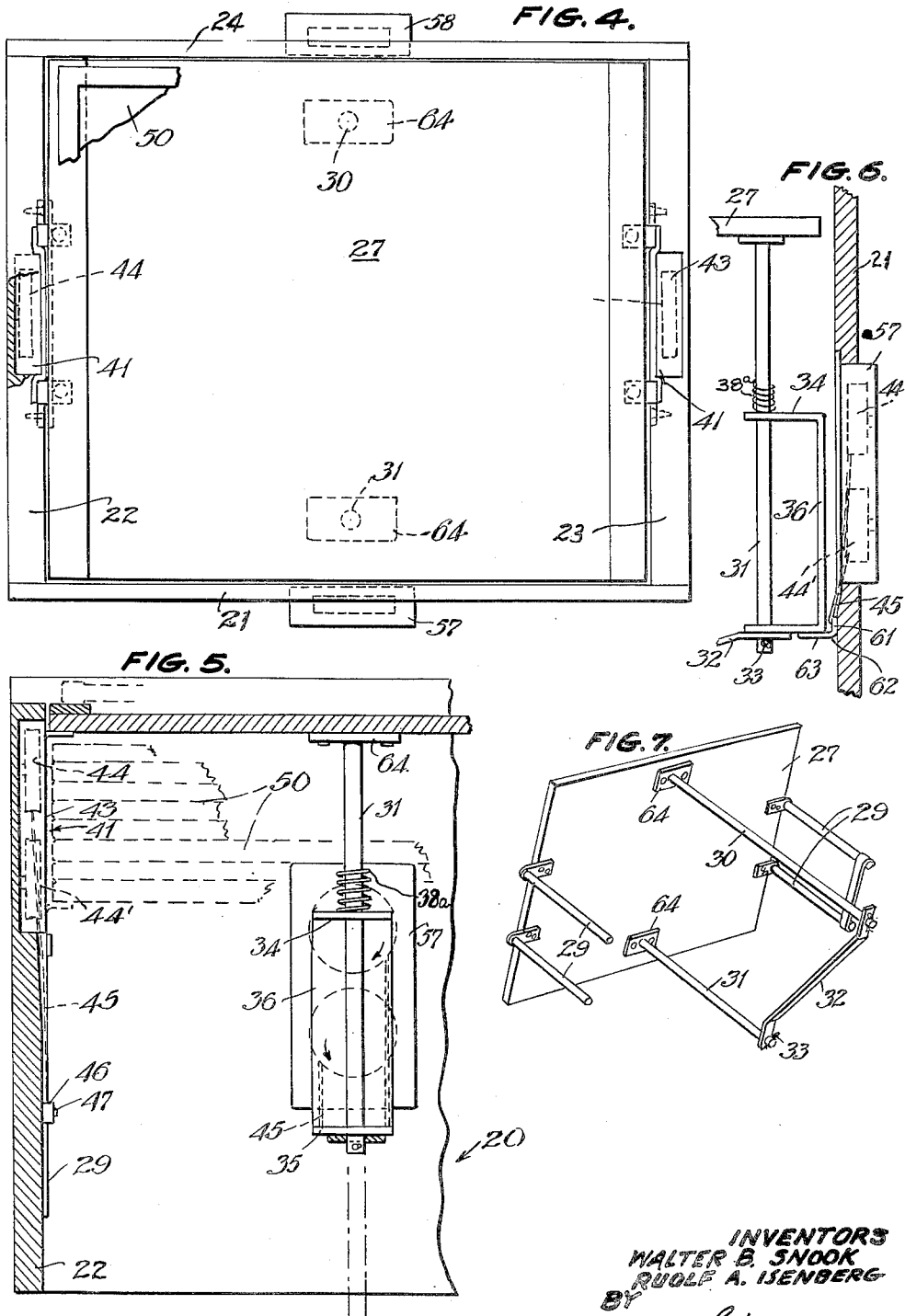
INVENTORS
WALTER B. SNOOK
RUDOLF A. ISENBERG
BY
Henry Gifford Hardy
ATTORNEY Sept. 15, 1953    W. B. SNOOK ET AL    2,652,498
APPARATUS FOR RAPID X-RAY EXPOSURES
Filed Jan. 13, 1949    5 Sheets-Sheet 3
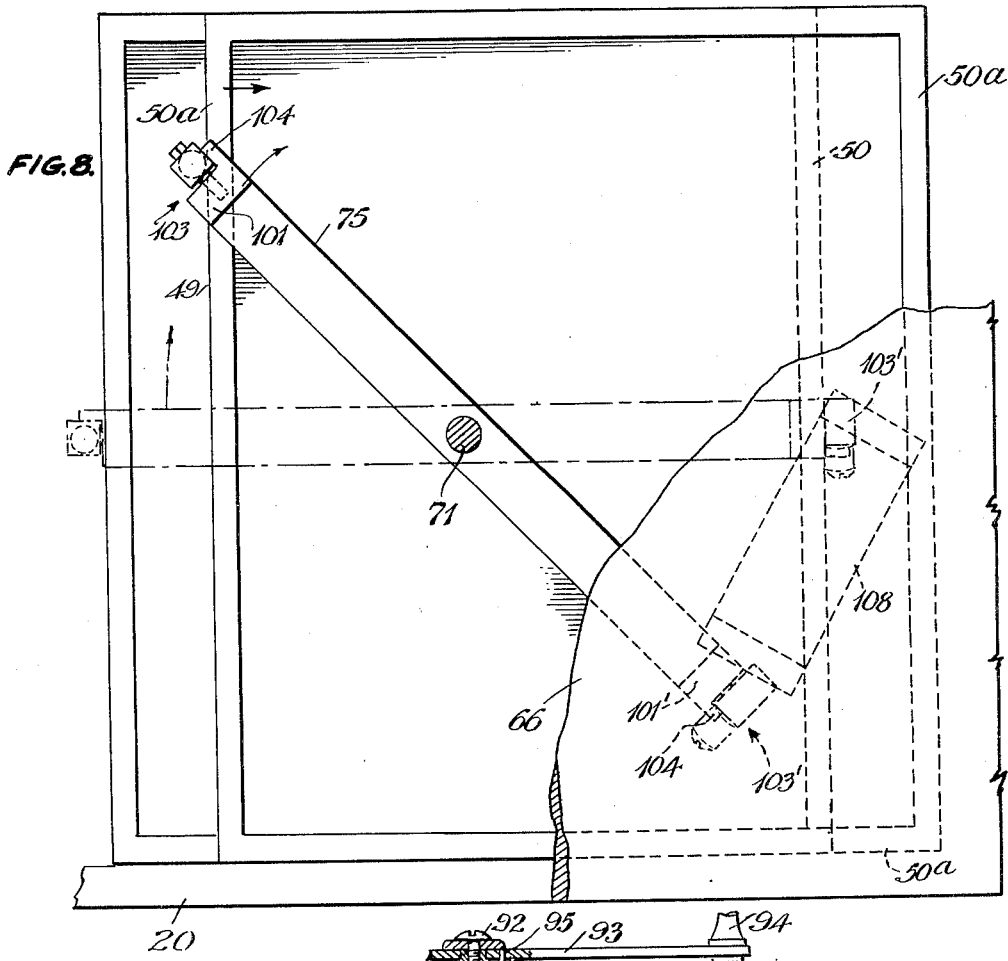
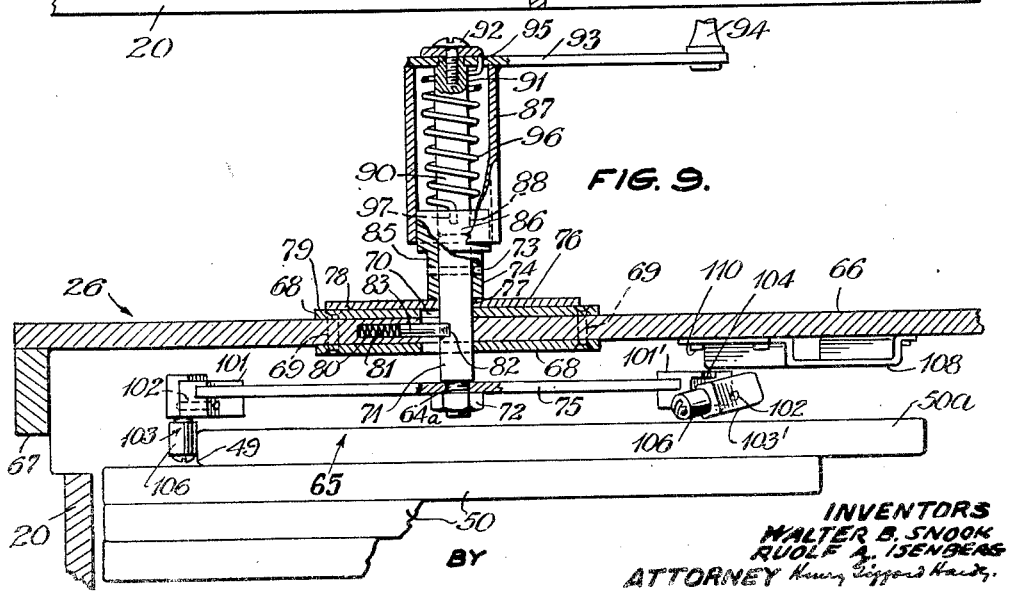
INVENTORS
WALTER B. SNOOK
RUOLF A. ISENBERG
BY
ATTORNEY

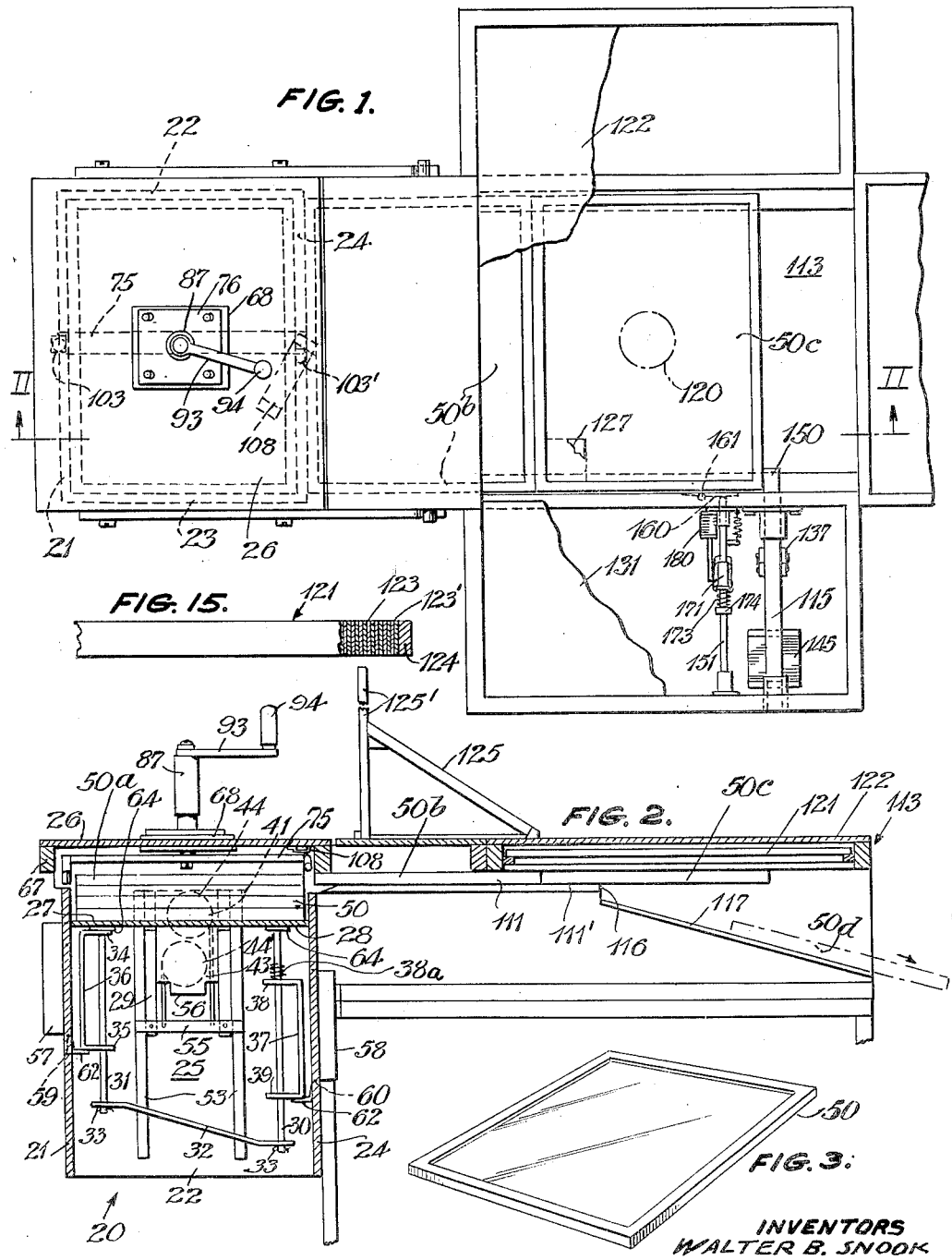

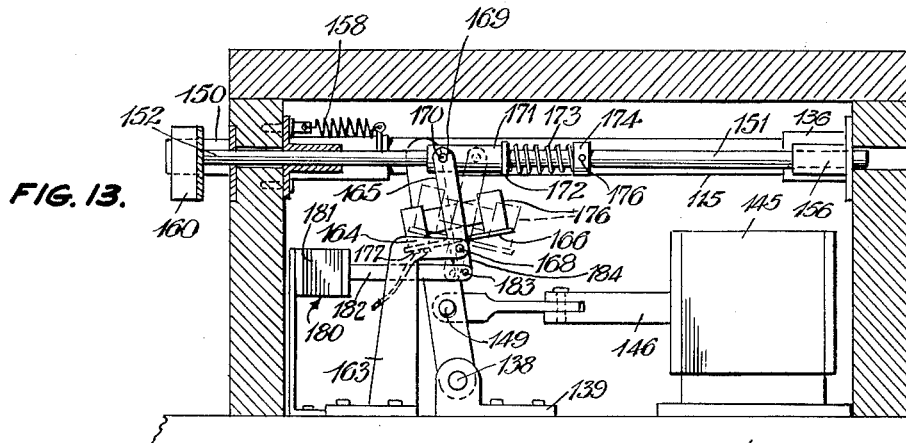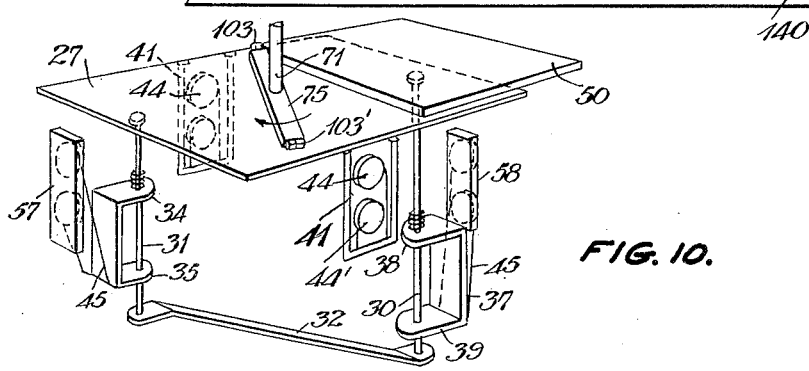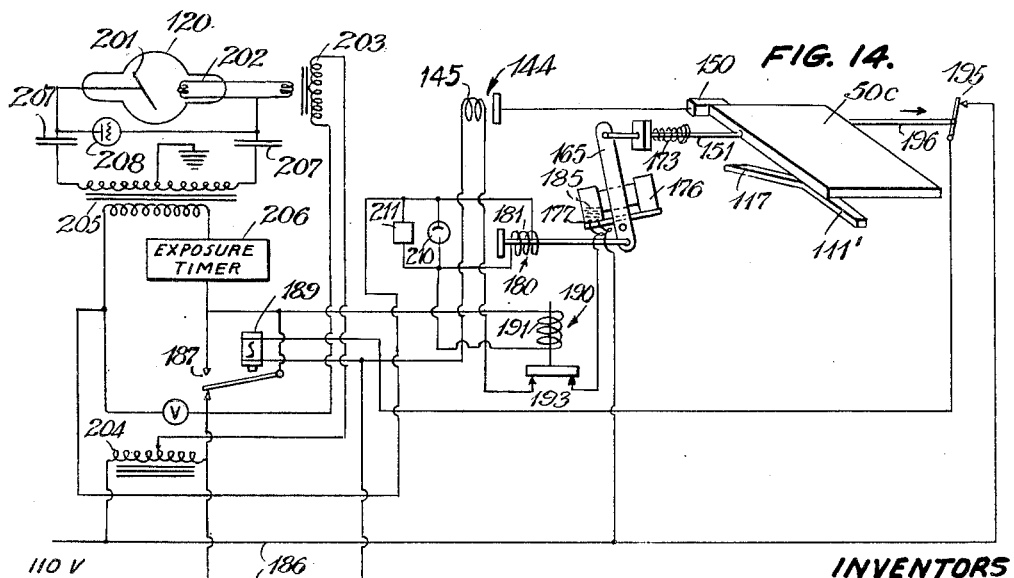

Sept. 15, 1953   W. B. SNOOK ET AL   2,652,498
APPARATUS FOR RAPID X-RAY EXPOSURES
Filed Jan. 13, 1949   5 Sheets-Sheet 5

INVENTORS
WALTER B. SNOOK
RUDOLF A. ISENBERG
BY Henry Gifford Hardy
ATTORNEY

Patented Sept. 15, 1953

2,652,498

UNITED STATES PATENT OFFICE 2,652,498

APPARATUS FOR RAPID X-RAY EXPOSURES

Walter B. Snook and Ruolf A. Isenberg, Palo Alto, Calif., assignors to W. B. Snook Mfg. Co., Inc., Palo Alto, Calif., a corporation of California Application January 13, 1949, Serial No. 70,684

14 Claims. (Cl. 250—66)

This invention relates to a method and apparatus for rapid X-ray exposures and more particularly to the espousement of photographic magazines with X-ray apparatus for rapid sequence X-ray photography.

In the investigation of physiological processes and in conducting medical studies of organs of the human body, such as the heart, brain, or stomach, it has been previously indicated that a predetermined or selected rate sequence or series of high speed X-ray negatives would be of considerable value to physicians, surgeons, and other investigators, and undoubtedly would be of great benefit as a factual, recorded aid to medical diagnosis. The utility and desirability for rapid X-ray sequence recording in medical research has been substantially increased with the discovery that certain opaque media which produce true fluorescence upon exposure to X-ray radiation, may safely and painlessly be injected directly into the blood stream, stomach, or other vital organs of the human body. Efforts have been made heretofore to obtain such rapid sequence X-ray studies of malignant human growths and the functioning of human organs by the use of motion pictures. However, up to the present time X-ray negatives capable of being enlarged to the required size and possessing sufficient clarity and definition of detail to permit their unqualified use for medical research and diagnostic purposes, have not been produced by this means. Moreover, the conventional X-ray film magazines and automatic film changing devices heretofore employed in X-ray photography neither have sufficient magazine capacity nor are they capable of being actuated with sufficient rapidity to permit a dozen or more X-ray photographs measuring approximately 11″ x 14″ in size to be taken of a predetermined portion of the human anatomy in rapid sequence omitting any consideration of maintaining at the same time accurately determinable exposure intervals.

It is therefore an object of the present invention to provide a high capacity photographic magazine and exposure apparatus for use in rapid sequence X-ray photography for use with standard size X-ray film.

It is another object of the instant invention to provide a high capacity photographic magazine which is operable to deliver cassettes containing unexposed X-ray film to a predetermined target or exposure position at a rapid rate, and which will automatically discharge each cassette therefrom as soon as the X-ray exposure has been completed.

It is also an object of the present invention to produce a high capacity photographic magazine having a mechanism progressively tensioned to vertically elevate a pile or stack of cassettes, particularly the relatively heavy X-ray cassettes, in predetermined sequence to a delivery position at the top of the magazine, the magazine being operable to discharge cassettes laterally at a rapid rate.

It is a further object of this invention to produce a progressively tensioned photographic magazine adapted to receive and store a vertical stack or pile of X-ray cassettes or the like, in a position disposed below an exposure table, a mechanism operable to laterally move the said cassettes in predetermined sequence from the top of the magazine to a target for exposure position, and a sequence control device adapted to automatically release each cassette from the target position after the exposure thereof has been completed.

It is a further object of this invention to produce a progressively tensioned photographic magazine adapted to raise a vertical pile of film holders in predetermined sequence to a discharge position at the top of the magazine, and a mechanism for transmitting rotary motion into straight line motion operable to intermittently discharge film holders from the top of the said magazine at a predetermined rate, together with safety means to prevent delivery unless the target area is clear.

It is also an object of the present invention to provide exposure control apparatus intermittently operable to accurately expose in sequence each of a plurality of X-ray cassettes in a predetermined target or exposure position, the said control apparatus being automatically operable to release and permit the removal of each cassette from the said target position after the X-ray exposure thereof has been completed.

Further objects are to provide a construction of maximum simplicity, economy and ease of assembly and disassembly, also such further objects, advantages and capabilities as will fully appear and as are inherently possessed by the device and the invention described herein.

The invention further resides in the combination, construction and arrangement of parts illustrated in the accompanying drawings, and while there is shown therein a preferred embodiment of suitable apparatus for carrying out this invention, it is to be understood that the same is merely illustrative, and that the invention is capable of modification and change and comprehends other details of construction without departing from the spirit thereof or the scope of the appended claims.

Referring to the drawings:

Figure 1 is a plan view of the X-ray film magazine and exposure positioning device.

Figure 2 is a side elevational view taken along the line II—II in Figure 1, and looking in the direction of the arrows.

Figure 3 is a perspective view of a typical X-ray cassette film or plate holder adapted to be used with the device of Figure 1.

Figure 4 is a plan view of the X-ray plate or film magazine.

Figure 5 is a fragmentary elevational view of the magazine of Figure 4 showing a pile of cassettes or film holders therein.

Figure 6 is a fragmentary elevational view showing the supplemental means for raising the cassettes or plate holders of Figure 5 progressively to the top of the magazine.

Figure 7 is a bottom perspective view showing the guiding and supporting means for the resilient platform of the magazine.

Figure 8 is a plan view of the device for laterally transporting the cassettes or film holders from the top of the magazine progressively and in sequence to the positioning and exposure device.

Figure 9 is a fragmentary elevational view of the magazine unloading mechanism of Figure 8 showing the actuating means therefor.

Figure 10 is a perspective view of the device of Figure 8.

Figure 13 is an elevational view of the exposure control relay illustrated in Figure 11.

Figure 14 is a schematic wiring diagram showing a conventional X-ray machine employing the magazine and positioning device of Figure 1.

Figure 15 is a fragmentary cross-sectional view of a filter screen adapted to allow only normally directed X-ray emanation to reach each cassette during the exposure thereof.

Figure 11:
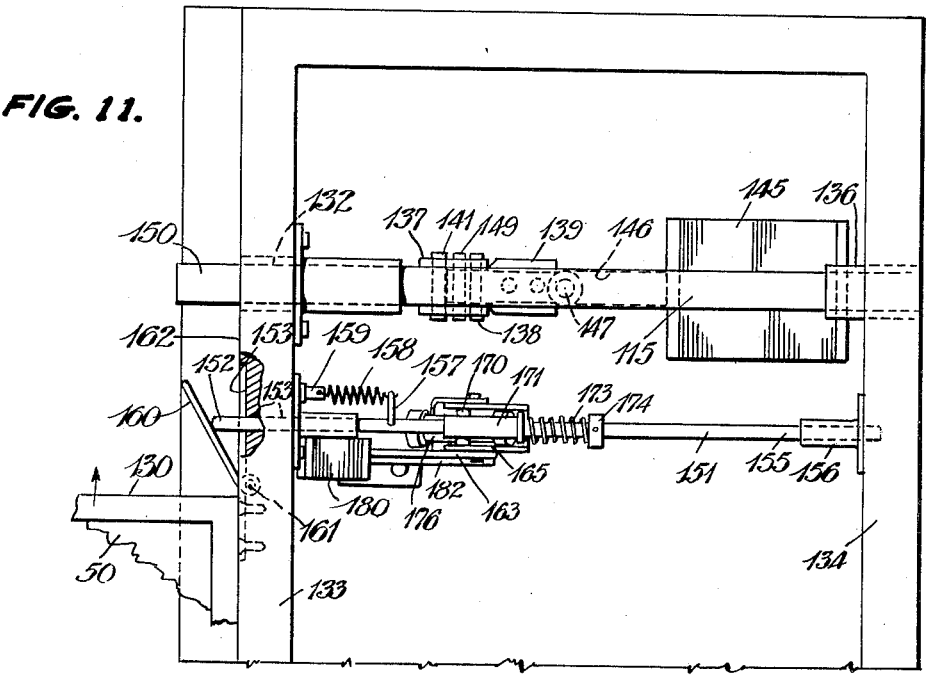
Figure 11 is a plan view of the cassette positioning and exposure control relays illustrated in Figure 1.

Referring now more particularly to the drawings, in which like reference numerals indicate like parts in the several views, there is shown generally at 20 a photographic magazine having end walls 22 and 23 and side walls 21 and 24 adapted to form an enclosure 25 normally covered by a removable top 26. Horizontally disposed within the enclosure 25 is a vertically moveable rectangular platform 27 having secured to the bottom surface 28 and along the short side thereof two pairs of oppositely disposed and downwardly directed strap or tubular slide members 29. Also secured to the bottom surface 28 of the platform 27 are the spaced and downwardly directed tubular column members 30 and 31. The column 30 is somewhat longer than the column 31, and a transverse member 32 extending therebetween has its end portions secured by the pins 33 to the free extremities of the columns 30 and 31. The tubular slide members 29 coact in loose sliding engagement with coacting fittings secured to the interior surface of the end walls in such a manner as to tend to normally retain the platform 27 in the horizontal position. The column 31 slidably extends through the upper and lower end portions 34 and 35, respectively, of the movable bracket 36. The column 30 similarly extends through the end portions 38 and 39 of the lower bracket 37, and is normally retained in loose sliding engagement therewith in a position substantially below the level of the intermediate bracket 36.

Recessed within the inner sidewalls 22 and 23 at a position immediately adjacent the top edge 40 of the magazine 20, is a pair of oppositely disposed spring tension units 41 having the inner surface 42 thereof mounted flush with the interior surface of the sidewalls 22 and 23. Each of the relatively light acting conventional spring tapes or tensioning devices 41 includes a housing 43 having a pair of vertically aligned drums 44 and 44' rotatably mounted therein, the said drums tending at all times to rotate in opposite directions in accordance with the resilient action of an internal torsion spring tending at all times to impart a substantially uniform torque of predetermined magnitude to the drums 44 and 44'. Attached at one end to the outer surface of these drums are the cords 45, which have their free ends 46 secured at the point 47 to the slide members 29 carried by the platform 27. The tension exerted on the cords 45 by the internally contained torsion springs, which tend to oppositely rotate the drums 44 and 44', is such as to exert a total upward thrust sufficient to progressively elevate the first group of five or more cassettes or film holders 50, in opposition to the action of gravity, to the top of the magazine 20 without exerting excessive upward pressure on the top plate 50a. In Figure 3 there is shown a typical X-ray cassette or film holder 50 which forms the stack or pile of cassettes placed within the magazine 20, the individual cassettes or film holders 50 preferably being approximately 11 x 14 inches in size and each weighing approximately five pounds. Although a total of fifteen or more such relatively large and heavy cassettes may be placed in the magazine 20 when fully loaded, the action of the spring tension unit 41 in the end walls 22 and 23 is uniform throughout the unloading cycle and is substantially independent of the number of cassettes remaining in the magazine 20 at any particular time.

The vertical movement of the platform 27 may be guided and directed by conventional means, such as the interior surfaces of the parallel and spaced apart strips or cleats 53 which slidably engage with the coacting outer surfaces of the slide bars 29, or telescoping tubular support members may be used, if desired. A horizontal bar 55 affixed to the lower extremities of the slide bars 29 preferably limits the maximum upward movement of the platform 27, in opposition to the upward thrust exerted by the spring tension unit 41, by contact with the stop 56 secured to the lower surface of the tension unit 41.

Mounted in the interior wall of the sides 21 and 24 of the enclosure 25 are the supplemental intermediate and lower spring tension units 57 and 58, respectively. These units 57 and 58 are of conventional design and are constructed and arranged in the same manner as the upper tension units 41, except that the lower unit 58 is adapted to exert a much stronger tension force on the cords 45 than the two upper units 41, and the intermediate unit 57 is adapted to exert a tension on the cords 45 having a magnitude greater than the tension exerted by the two upper units 41 but less than the tension exerted by the stronger lower unit 58. Since the units 57 and 58 are larger and stronger than the units 41, the housing 43 therefor may extend entirely through the apertures 59 and 60 cut in the respective walls 21 and 24. Aperture 60 is cut in the wall 24 at a position farthest removed from the top edge 40 thereof whereas the aperture 59 in the wall 21 is located at a level intermediate the level of the aperture 58 and the location of the spring tension unit 41 for the walls 22 and 23. The tension cords 45 for the units 57 and 58 are secured to the vertical leg 61 of the angles 62, the horizontal legs 63 of which are retained in resilient contact with the lower ends 35 and 39 of the respective sliding brackets 36 and 37.

Thus, as the magazine 20 is loaded with the stack of cassettes or films 50, the platform 27 is progressively lowered within the enclosure 25 in opposition to the upwardly directed tension exerted by the cords 45. As the first few cassettes 50 are placed into the magazine 20, only the spring tension unit 41 in the walls 22 and 23 is required to overcome the total weight of the cassettes, but as the platform 27 is farther depressed into the enclosure 25 the intermediate and lower spring tension units 57 and 58 are progressively actuated to supplement and assist the unit 41 in overcoming the increased weight of the additional cassettes and in effecting a predetermined continuous and progressive upward lifting movement thereto. Actuation of the tension units 57 and 58 is initiated at predetermined positions of the platform 27 by contact of the base 64 of the columns 31 and 30 with the upper end 34 and 38 of the brackets 36 and 37 in a progressive sequence as the magazine is loaded, and actuation of the supplemental spring tension units 57 and 58 is also terminated as soon as the base 64 and the upper end 34 of the brackets 37 and 36 become successively disengaged as the unloading of the magazine progresses. A compression spring 38a placed on the rods 30 and 31 immediately above the upper ends of the brackets 36 and 37 preferably is used to cushion the transition between successive stages.

The removable top 26 of the magazine 20 includes a horizontal panel 66 having vertical side members 67 extending downwardly from the outer extremities of the panel 66 so as to form a cover for the magazine. A pair of plates 68 are affixed to the central portion of the panel 66 on opposite sides thereof by the recessed screws 69. An oblong or slotted hole 70 formed in the plate 68 and the panel 66 is adapted to receive for free turning movement therein a shaft 71, the upper end of which is keyed by the pin 73 to the cylindrical coupling 74, and the lower end of which carries a stub axle 64a that extends through the central portion of the horizontal bar 75 and is secured thereto by the nut 72. A slidable plate 76 has formed on the central portion thereof a round hole 77 slightly larger than the shaft 71, and the lower surface 78 of the plate 76 is free to slide along the upper surface 79 of the plate 68 in a lateral direction determined by the orientation of the slotted hole 70. A recess 80 horizontally disposed interiorally within the panel 66 is adapted to receive a compression spring 81 which at all times tends to urge the saddle portion 82 of the sliding pin 83 against the shaft 71 so as to normally retain the shaft in the position farthest toward the right as viewed in Figure 9.

The cylindrical coupling 74 has an upper portion 86 of greater diameter than the lower portion 85 thereof which is keyed to the shaft 71. The upper portion 86 has a diameter slightly smaller than the interior diameter of the outer sleeve 87, and also has an inner bore 88 adapted to receive and support for free turning movement therein the lower end 89 of the vertical shaft 90. The upper end 91 of the shaft 90 is secured by the screw 92 to one end of the horizontal bar 93, the free end 84 of which is adapted to rotatably support the vertical handle 94. The horizontal bar 93 is affixed to the top of the shaft 90 and to the outer sleeve 87 so as to support the latter for rotation about a vertical axis substantially concentric with the axis of the shaft 90. The bar 93 also has formed therein a hole 95 adapted to receive one end of a torsion spring 96, the opposite end of which engages with a hole 97 formed in the upper portion 86 of the coupling 74; thus the spring 96, which is axially disposed along the shaft 90, transmits torque to the shaft 71 when the handle 94 is turned to rotate the shaft 90 about its axis.

A torsion drive assembly 65 is provided for converting rotary movement into a predetermined straight line movement which is adapted to remove the upper cassette 50a continuously and progressively from the top of the pile of cassettes in the magazine 20. Affixed to the opposite ends of the horizontal bar 75 are the terminals 101 and 101', each having dowel pins 102 extending laterally outwardly therefrom which are adapted to support for free turning movement thereon the respective toggle cam assemblies 103 and 103'. The terminals 101 and 101' are also formed with the positive stops 104 disposed on one side of the dowel pins 102 so as to coact progressively in sequence with the adjacent sides 105 of the respective toggle cam assemblies to limit the turning movement of the cams when the rollers 106 carried by the free ends thereof are in engagement with the trailing edge 49 of the top plate 50a, thereby converting the rotary movement of the bar 75 into a predetermined straight line lateral movement. As soon as the desired intermittent lateral movement has been imparted to the top cassette 50a by the action of the toggle cam assemblies 103 and 103', the upper edge of each cam strikes a horizontally disposed cam plate 108, which is secured to the lower side of the panel 66 by the bolts 110, and is adapted to rotate the toggle cams approximately 90° so that each cam assembly progressively assumes an approximately horizontal position wherein the roller 106 is temporarily out of engagement with, and is free and clear of, the trailing edge 49 of the cassette. Thus, the toggle cam 103' is free to move across the horizontal surface of the cassette 50a which has just been raised out of the magazine 20. The cam assembly 103' is retained in the inactive position by the cam plate 108 until the rotational movement of the shaft 71 has been completed and the arm 76 has been rotated to the position illustrated by the dotted lines in Figure 8. Thereafter, each toggle cam assembly 103' is free to assume a vertical position wherein it is free to engage with the trailing edge 49 of the next cassette 50a to be discharged from the top of the magazine 20. Engagement between the trailing edge 49 and the coacting roller 106 may be effected by so weighting the toggle cam assemblies that they will fall by gravity action to assume a vertical position as soon as they pass beyond the influence of the cam plate 108 and the cassette 50b, or the engaging action of each toggle cam assembly with the trailing edge 49 of the next cassette 50a may be assisted by a small torsion spring, if desired.

The action of the torsion drive assembly 65, when actuated by turning the arm 75 in a clockwise direction, is to accumulate sufficient potential energy in the torsion spring 81 to overcome any friction forces acting on the cassettes to be released from the magazine 20, thereby imparting a lateral movement progressively to each cassette 50a so that the abutting cassettes in the positions 50a, 50b, and 50c move intermittently, along the horizontal ways 111 disposed below the surface 112 of the table 113. Thus, as the magazine 20 is unloaded by turning the actuating handle 94 each cassette 50 in the magazine assumes progressively during the unloading thereof an initial position 50a at the top of the magazine 20, an intermediate position 50b along the ways 111 and below the table 113, and a final exposure position 50c. In the final exposure position 50c, the cassette is supported only partially along its length by the cantilever action of the outer portion 111' of the ways 111, the cassette 50c being free to pivot about the horizontal edge 116 as a fulcrum whenever the sliding bolt 115 is moved to the fully retracted position. When the bolt 115 is moved to the fully retracted position, the cassette is released from the position 50c and is free to fall into the inclined discharge chute 117, which has an angle of repose sufficient to overcome the friction forces acting on the fully exposed cassette in the position 50d, so that the latter is free to slide out of the device and into a suitable auxiliary container not shown. Although a conventional hamper may be used to receive the exposed cassettes discharged by the inclined chute 117, a container having a resiliently supported horizontal platform therein may be used for this purpose, if desired. Obviously, to secure the maximum efficiency of the device the exposed cassettes are gathered in the same sequence as they are exposed, without dropping, jarring or other danger of damage.

The film holders or cassettes 50 are of conventional design and of a type suitable for X-ray photography, and preferably are loaded with unexposed X-ray film having photographic emulsions on both sides thereof, the uppermost emulsion being held in direct contact with a conventional X-ray intensifying screen formed by a plastic or other base coated with a heavy metal salt which possesses the characteristic of luminescence from fluorescence when exposed to X-rays. By maintaining such an intensifying screen (not shown) directly in contact with the film placed within each cassette, an X-ray negative of improved quality and clearness of detail may normally be obtained. Because of the tendency of such intensifying screens to decrease the period of exposure, the X-ray emanation of the tube 120 supported above the exposure table 113 should be decreased sufficiently so that the exposure required when such screens are used will be relatively short and preferably not longer than $\frac{1}{10}$ of a second. Also interposed between the X-ray tube 120 and the cassette in the exposure position 50c is a vertically laminated screen 121 which preferably is disposed below the working surface 122 of the exposure table 113. The screen 121 may be of any conventional suitable type but for purposes of illustration it may be composed of vertically disposed alternating layers of lead 123 and wood 123', the vertical depth of the lamination being about $\frac{3}{16}$ of an inch and the thickness of the individual lead and wood layers 123 and 124 being approximately $\frac{1}{50}$ of an inch. The laminated filter screen 121 is contained within the supporting frame 124, and acts as an absorption filter for all X-ray radiation except the substantially parallel X-rays which strike the screen 121 in a vertical plane substantially parallel to the plane of the individual laminated layers 123 and 124, thereby permitting only normally directed X-ray emanation to pass through the screen 121. A lead screen 125 is also preferably supported by the frame 126 on the table 113 in a position immediately above the intermediate cassette position 50c, so as to shield the latter from inadvertent exposure to spurious and scattered X-ray emanations during the exposure of the cassette in position 50c immediately below the X-ray tube 120. The lead shielding 125 and 125' protects the operator from spurious and scattered radiation which unless shielded would be extremely dangerous. A conventional interval timing device 127, preferably driven by a synchronous motor or other synchronized timing mechanism, is disposed below the working surface 119 of the table 113 and above the cassette 50c so as to project a photographic image on one corner of the X-ray negative which will indicate the relative position of each individual plate in the exposure sequence as well as the elapsed time interval between successive exposures. It is frequently desirable that such additional data be permanently recorded photographically on each plate simultaneously with the exposure thereof. If desired, the timing device 127 may comprise a large plastic wheel having lead numerals printed thereon at convenient intervals such as 20 degrees, and preferably has five radially spaced apart lead dots between the successive numerals. The wheel 127 may be slowly rotated at a uniform speed by a conventional clock movement so as to complete one revolution in any convenient time interval such as 20 seconds. This plastic wheel 127 preferably coacts with a fixed lead pointer in such a manner as to cast a photographic shadow on one corner of each cassette during the exposure thereof, thereby recording simultaneously with the exposure of each cassette the sequence of the individual exposures and providing a means of determining the approximate time interval between successive exposures, several of which may occur within a single second.

It will be noted that except for the actuating arm 93 and the lead shield 125, all operating components of the magazine 20 and the associated exposure positioning mechanism are conveniently submerged below the working surface of the exposure table 113 so that a patient may be readily placed on the surface of the table 113 in such a manner that the desired physiological process may be photographed by means of X-rays without interference or hindrance from surrounding obstructions.

Figure 12:
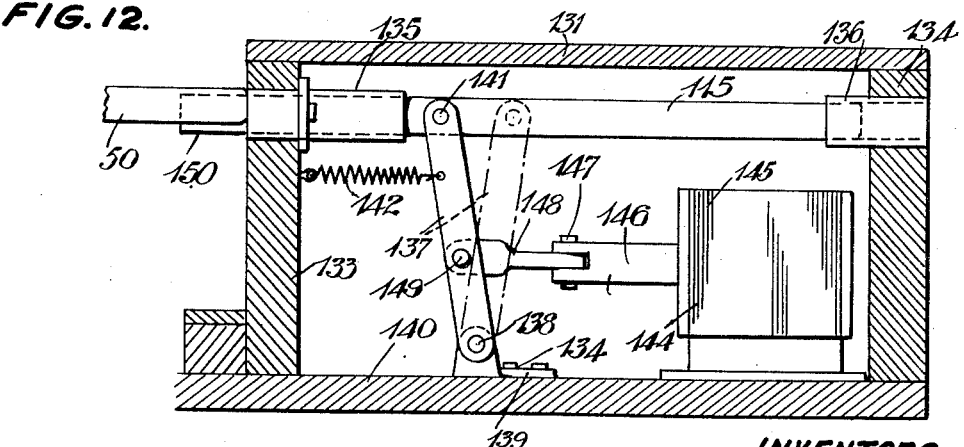
Figure 12 is an elevational view of the cassette positioning relay of Figure 11.

Means is provided to automatically control the movement of the cassettes being unloaded from the magazine and to automatically actuate the X-ray tube when the individual cassettes have momentarily been brought to rest in a predetermined exposure position. Disposed below the surface of the panel 131 of the exposure table 113 is a sliding bolt 115 normally adapted to project through aperture 132 in the vertical panel 133 so as to engage with the leading edge 130 of each cassette as it reaches the exposure position 50c, thereby arresting all lateral movement of the plate during the exposure interval. The bolt 115 is slidably supported at its opposite end by the sleeves 135 and 136 carried by the vertical panels 133 and 134, respectively. A lever arm 137 is pivotally attached by the pin 138 to a bracket 139 supported on the horizontal base 140, and at its opposite end the arm 137 is pivotally secured by the pin 141 to the sliding bolt 115. The arm 137 is normally retained by the action of the tension spring 142 in the position indicated by the solid lines in Figure 12. Disposed on the opposite side of the arm 137 from the spring 142 is a solenoid 144, preferably of the alternating current type, which is supported on the base 140. The solenoid 144 has a coil 145 and an armature 146, the latter being attached by the pin 147 to a link 148 having its other end pivotally attached to the arm 137 at a point 149 which is between the upper and lower extremity thereof. The armature 146 of the solenoid 144 is adapted to be actuated in such a manner as to move the arm 137 to the dotted line position illustrated in Figure 12 and in opposition to the action of the tension spring 142, thereby retracting the sliding bolt 115 in such a manner as to release the end 150 thereof from engagement with the leading edge 130 of the plate in the exposure position 50c.

Also disposed in the same horizontal plane as the sliding bolt 115, and in a position laterally forward thereof, is a cam rod 151 slidably supported by a sleeve 154 and normally having one end 152 thereof projecting through a hole 153 in the panel 133. The opposite end 155 of the rod 151 is slidably supported by a sleeve 156 affixed to the inner surface of the vertical panel 134. Secured at one end to an arm 157 on the rod 151 is a tension spring 158 having its other end secured to a screw 159 affixed to the wall 133 in a position adjacent to the sleeve 154. The hinge 160 pivots about a vertical pin 161 recessed within the exterior surface 162 of the wall 133, and the hinge 160 is adapted to retract the end 152 of the rod 151 into the hole 153 when the hinge 160 is moved to the closed position and flush with the surface 162 by coaction with the leading edge 130 of a cassette being moved from the intermediate position 50b to the exposure position 50c.

Secured to the base 140 in a position laterally adjacent to the bracket 139 is a bracket 163 having a right angle extension 164 thereon. A lever 165 is pivotally supported by the pin 168 on the free extremity of the extension 164. The upper end 169 of the lever 165 is pivotally attached by the pin 170 to a sleeve 171 adapted to be slidably supported on the rod 151. The end of the sleeve 171 farthest removed from the pin 170 has a shoulder 172 thereon adapted to coact with one end of the compression spring 173, the opposite end of which is in resilient engagement with a collar 174 secured to the rod 151 by the pin 175. A bracket 166 affixed to one end of the pin 168 symmetrically supports for pivotal movement about the axis of the pin 168 a mercury switch 176 having contacts 177 at one end thereof adapted to be in the closed and open positions when the lever 165 is positioned as indicated by the respective solid and dotted lines in Figure 13. A toggle switch relay 180 supported by the base 140 has a coil 181, and an armature 182 connected by the pin 183 to the lower portion 184 of the lever 165. The normal action of the relay 180 is not sufficient to move the lever 165 and the mercury switch 176 carried thereby to the closed circuit position, in opposition to the action of the tension spring 158, as long as the hinge 160 is in the open position illustrated in Figure 11. However, as soon as the leading edge 130 of a cassette being delivered to the exposure position 50c closes the hinge 160 to cause the rod 151 to slide in the sleeves 154 and 156 in opposition to the action of the tension spring 158, the resilient pressure exerted by the action of the compression spring 173 on the collar 174 is sufficiently reduced in magnitude that the normal closing action of the relay 180 causes the lever 165 and the mercury switch 176 to pivot about the pin 168 as an axis, in opposition to the resilient action of the compression spring 173, and to the closed circuit position indicated by the dotted lines in Figure 13.

Referring now to Figure 14, there is shown the toggle switch relay 180 having its coil 181 connected in series with the actuating coil 191 of the relay 190. The relay 180 preferably is of the electro-mechanical interlocking type and is prevented by the resilient action of the compression spring 173 from turning the lever arm 165 so that the pool of mercury 185 will close the contact 177 of the mercury switch 176 until such time as the normal resilient pressure exerted by the compression spring 173 is relieved by actuation of the cam rod 151 as the cassette closes the hinge 160 prior to coming to rest in the exposure position 50c. As soon as the cassette is properly positioned in the exposure position 50c and the leading edge 130 thereof comes to rest against the sliding bolt 115, the mercury switch 176 can be moved to the closed position by energizing the coil 181 of the relay 180.

The relay 190 is of a suitable magnetic type having normally closed contacts which are adapted to be opened by the flow of current through the actuating coil 191. The relays 180 and 190 have their actuating coils connected in series, and the flow current therethrough tends to open the contacts 193 of the magnetic relay 190 and to close the contacts 177 of the interlocking relay 180. Connected in series across the power lines 186 are the contacts 177 for the mercury toggle switch 176, the contacts 193 of the magnetic relay 190, and the actuating coil 145 for the main release solenoid 144. The actuating coil 191 of the relay 190 has connected in parallel therewith a glow tube 210 adapted to visually indicate the exposure interval, and a suitable sequence counter 211 which indicates the number of exposures that have been made in a particular sequence, thereby providing a means of determining at any particular time the number of unexposed film holders remaining in the magazine 20. Also connected in series across the power lines 186 with the actuating coil 188 for the exposure control relay 189 is a switch 195 having normally open contacts adapted to be closed by a cam rod or actuating extension 196 adapted to engage with the edge of each cassette just prior to the time when it is brought to rest in the exposure position 50c by striking the sliding bolt 115, and the switch 195 is operable to close the exposure control contacts 187 of the control relay 189. It will also be apparent that the main control relay 144 can not be actuated to release the cassette 50c from engagement with the sliding bolt 115 until the contacts 193 of the magnetic relay 190 and the contacts 177 of the toggle mercury switch 176 are both in the closed position.

A conventional X-ray tube 120, having an anode 201 and a cathode 202 is supplied with low voltage current by a filament transformer 203 having its primary winding connected to the variable voltage auto transformer 204, which also supplies current to the low voltage winding of the high voltage transformer 205 whenever the contacts 187 of the exposure control relay 189 are in the closed position. The anode and cathode elements 201 and 202, respectively, of the X-ray tube 120 are connected in parallel with the conventional half-wave rectifier 203 and are also connected with the high voltage winding of the transformer 205 through the condensers 207. A conventional exposure timer 206 is also connected in series with the low voltage winding of the transformer 205 and with the contacts 187 of the exposure control relay 189. Although the initiation of the X-ray exposure interval is effected by the closing of the contacts 187 of the relay 189, the duration of the exposure interval is determined by adjusting the conventional exposure timer 206, as required.

*Operation*

In loading the magazine 20 prior to operation, the cover 26 is first removed, along with the tortion drive assembly 65 supported thereon, by raising the cover after conventional hooks or fasteners holding the side members 67 in engagement with the top of the magazine have been released. When the magazine 20 is completely unloaded the platform 27 is maintained in its uppermost position within the magazine by the resilient action of the spring tension units 41. As the first pile of five or more unexposed cassettes 50 are placed on the platform 27 it is depressed downwardly into the upper zone 25a thereof in opposition to the resilient action of the tension units 41, and as additional unexposed cassettes are placed in the magazine enclosure 25 the platform 27 continues to descend downwardly into the intermediate zone 25b thereof and compresses the spring 38 slidably supported on the rod 31 in a position immediately above the upper end 34 of the sliding bracket 36. Thereafter the compression spring 38a becomes compressed to its maximum extent and the upper abutment 64 of the rod 31 enters into pressing engagement with the upper end 34 of the intermediate bracket 36, thereby depressing the bracket 36 downwardly into the lower zone 25c and in opposition to the resilient action of the spring tension unit 57, which exerts a predetermined upward pressure on the bracket 36 by means of the tension cords 45 and the sliding angle 63 which resiliently coact with the lower end 35 of the bracket. Thus, the intermediate tension unit 57 tends to counterbalance the weight of additional cassettes placed within the magazine enclosure and supplements the action of the spring tension unit 41 in tending to raise the pile of cassettes progressively to the top of the magazine. As the loading of the magazine 20 enters its final stage the lower spring tension unit 58 is actuated in the same manner as the intermediate tension unit 57, thereby causing the sliding bracket 37 to exert an additional upwardly directed resilient pressure, tending to counterbalance the weight of the increased number of cassettes placed within the magazine. Although only two such supplemental tension units 57 and 58 have been described, additional units may be provided as required to further increase the capacity of the magazine 20 without departing from the scope of the instant invention. During the unloading of the magazine 20, the supplemental spring tension units 58 and 57 become deactivated progressively as the number of cassettes within the partially filled magazine is reduced. In this manner the upward resilient pressure acting on the platform 27 is progressively reduced as the unloading process progresses, thereby eliminating excessive frictional forces tending to bind the top plate 50a in the upper zone 25a and cause it to stick in the top portion of the magazine. It is apparent that the weight of the stack of cassettes is reduced as the device is applied. Hence the force required to position the last few is much less than that required for the first few. This means progressively reduces the force of the upper pressure so that the last few will not be subjected to excessive pressure and the attendant difficulties.

As soon as the magazine 20 has been completely loaded with cassettes the cover 26 is placed over the top of the magazine and is maintained in place thereon by suitable hooks or fastening means. Whenever it is desired to unload cassettes from the magazine 20, the actuating arm 93 for the torsion drive assembly 65 is turned clockwise by means of the handle 94, thereby storing potential energy within the torsion spring 96. After sufficient potential energy has been stored up in the torsion spring 96 to overcome the frictional forces normally acting on the top cassette 50a in the magazine 20, a rotational movement is imparted to the shaft 71 through the coupling 74 so as to cause rotational movement of the horizontal arm 75. The roller 106 of the toggle cam assembly 103 engages with the trailing edge 49 of the top cassette 50a so as to impart a horizontal movement thereto toward the right, as viewed in Figures 8 and 9, as the clockwise rotation of the arm 75 progresses. After the required lateral movement of the cassette 50a has been effected by the rotating arm 75, the upper edge of the cam 103 engages with the cam plate 108 to turn the toggle cam about the dowel pin 102 as an axis so that the roller 106 thereof is raised out of engagement with the top cassette. The toggle cam assembly is maintained in this inactive position during the remainder of the turning movement of the arm 75, but is free to resume a vertical position as soon as the next operating cycle is initiated, thereby permitting the roller 106 to again engage with the trailing edge 49 of the next cassette 50a which is raised to the top of the magazine. Each top cassette 50a is ejected in turn from the magazine 20 by the rolling and sliding action of the cam toggle roller 106 and in accordance with the rotational movement of the horizontal bar 75. Thus, each cassette is caused to slide laterally along the ways 111 underneath the table 113 so as to progressively assume an intermediate position 50b and an exposure position 50c. In the latter position, each cassette is brought to rest by contact with the reciprocating or sliding bolt 115, which normally projects laterally outwardly so as to contact the leading edge 130 of the cassette. While in the exposure position 50c the cassette is supported at the opposite end thereof by the cantilever portion 111' of the ways 111. The lateral pressure normally exerted by the compression spring 81 in the recess 80 of the cover 26 normally forces the cassette in the exposure position 50c into predetermined frictional engagement with the bolt 115. Whenever the bolt 115 is retracted after the exposure of the cassette has been completed, each cassette in the position 50c is free to fall under its own weight so as to slide downwardly and outwardly along the inclined surface of the discharge chute 117.

As each cassette moves along the lateral ways 111 from the intermediate position 50b to the exposure position 50c, the leading edge 130 thereof moves the hinge 160 to the closed position, thereby moving the rod 151 to the right, as viewed in Figure 11, in opposition to the action of the tension spring 158. This reciprocal movement of the rod 151 does not effect a pivotal movement of the arm 165 about the point 168, but substantially relieves the resilient pressure exerted by the compression spring 173 on the coacting shoulder 172 of the sleeve 171, which is affixed to the upper extremity of the toggle switch arm 165. After the rod 151 has been depressed by the closing action of the hinge 160, and immediately prior to the time when the cassette is brought to rest in the position 50c by contact with the outwardly extending portion 150 of the sliding bolt 115, the leading edge 130 of the cassette closes a second hinge to depress the rod 196 and moves the normally open exposure switch 195 to the closed position. Closure of the switch 195 actuates the exposure control relay 189 to close the low voltage contacts 187, thereby initiating operation of the conventional exposure timer 206 connected in series with the low voltage winding of the high voltage transformer 205. The exposure timer 206 automatically interrupts the low voltage X-ray circuit after a predetermined exposure interval such as $\frac{1}{10}$ of a second has transpired. During the predetermined exposure interval, the contacts 187 of the relay 189 remain closed and allow current to flow through the actuating coil 191 of the magnetic relay 190 and through the actuating coil 181 of the toggle switch relay 180. The effect of the X-ray exposure current flowing through the relays 190 and 180 is to open the contacts 193 of the relay 190 and to close the contact 177 of the mercury switch 176 by turning the switch 176 about the pin 183 as an axis and in opposition to the decreased resilient action of the compression spring 173. The open condition of the contact 193 of the magnetic relay 190 during the exposure interval prevent the main control relay 144 from becoming energized during the exposure period. As soon as the exposure is completed, the relay 189 moves to its normally open position, thereby terminating the flow of current through the relays 180 and 190 and allowing the contacts 193 of the magnetic relay 190 to become closed. Upon closure of the contacts 193, current flows through the actuating coil 145 of the main control relay 144, thereby retracting the sliding bolt 115 in such a manner that the exposed cassette 50c is free to drop down onto the sloping surface of the discharge chute 117. As soon as the exposed cassette 50c has dropped free and clear of the position 50c and before another cassette moves into the position previously occupied by the exposed cassette, the hinge 160 again moves to the open position in accordance with the resilient action of the tension spring 158 and the arm 165 is rotated about the pin 168 to the solid line position illustrated in Figure 13, thereby moving the toggle switch 176 to the open circuit position. The micro-switch 195 also moves to the open circuit position following disengagement of the rod 196 with the coacting edge of the exposed cassette which is dropped onto the chute 117 and the magnetic relay 190 thereafter moves to the normally closed position. The mercury switch 176 is now positioned in the open circuit position, with the result that the actuating coil 145 for the main control relay 144 is deenergized so that the tension spring 142 is free to move the sliding bolt 115 toward the left, as viewed in Figure 12, so that the projecting edge 150 thereof forms a stop for the next cassette moving laterally into the exposure position 50c. Thus, the main control relay 144, the toggle switch relay 180, and the exposure switch 195 are automatically placed in the proper position for a new sequence of operations. As each cassette in the position 50c is exposed, the glow lamp and sequence counting device are actuated during the exposure interval so as to visually indicate to the operator that a particular cassette is being exposed, and to provide a convenient means of determining the number of unexposed cassettes remaining in the magazine 20 at all times during a particular exposure sequence.

We claim:

1. In a mechanism for unloading photographic cassettes from a magazine, the combination with a rotatable horizontal arm of a pair of toggle cams pivotally supported on each end of the said arm for movement along a circular path, each of the said cams having a roller thereon adapted to coact with the uppermost cassette in the said magazine for imparting a predetermined lateral movement thereto, and a cam plate disposed above a predetermined portion of the said cam and adapted to terminate the rolling engagement of the said roller with the said cassette when the said lateral movement thereof has been completed.

2. In a mechanism for unloading X-ray cassettes from a high capacity magazine the combination with an intermittently rotatable horizontal arm of a pair of toggle roller cams pivotally supported on each end of the said horizontal arm for movement along a circular path, each of the roller cams normally being maintained in a substantially vertical position, and a cam plate disposed above the said horizontal arm operable to turn and maintain each of the said vertically disposed roller cams to a substantially horizontal position during a predetermined portion of the said circular path.

3. In a mechanism for discharging photographic film cassettes from a magazine progressively and in a predetermined lateral direction, a combination which comprises torsion drive means operable to impart an intermittent rotational movement to a vertical shaft and to a horizontal arm carried thereby, a toggle roller cam pivotally supported on each end of the said horizontal arm for movement along a circular path, each of the said cams being operable to enter into rolling engagement progressively with the uppermost film cassette in the said magazine in such a manner as to impart a predetermined lateral movement thereto, and means disposed above a predetermined portion of the said circular path operable to maintain each of the said cams out of engagement with the said plate after the said predetermined lateral movement of said film cassette has been completed.

4. In a mechanism for discharging X-ray cassettes at high speed from a magazine progressively and in a predetermined lateral direction, the combination which comprises a torsion drive means operable to impart an intermittent rotational movement to a vertical shaft and to a horizontal arm carried thereby, a toggle roller cam pivotally supported on each end of the said horizontal arm for movement along a circular path, each of the said roller cams being adapted to normally be maintained in a substantially vertical position, and a cam plate disposed above the said path operable to turn and maintain the said vertically disposed roller cam to a substantially horizontal position during a predetermined portion of the said circular path.

5. An automatic exposure device for use in rapid X-ray photography comprising, resilient means for laterally sliding a plurality of X-ray cassettes along a pair of parallel ways progressively from an intermediate position to a predetermined exposure position immediately below an X-ray tube, a main control solenoid operable to assist the lateral movement of each cassette in the exposure position and to release the same from the said device after the exposure thereof has been completed, means responsive to the movement of the said cassettes along the said ways operable to prevent operation of the X-ray tube until each cassette has been properly placed in the exposure position, and time delay means operable to actuate the main control solenoid for releasing each exposed cassette from the said device after the exposure thereof has been completed.

6. A sequence exposure device for use in rapid X-ray photography, comprising means for intermittently moving a plurality of X-ray cassettes along a pair of parallel ways progressively from an intermediate position to a predetermined exposure position below an X-ray tube, a main control solenoid operable to arrest the lateral movement of each cassette in the exposure position and to release the same from the said device after the exposure thereof has been completed, means responsive to the movement of the said cassette along the said ways for controlling the operation of the X-ray tube, means operable to prevent firing of the X-ray tube until each cassette has been properly placed in the exposure position, and means to delay the said releasing action of the main control solenoid until a predetermined time after the exposure interval has been completed.

7. A cassette magazine and exposure positioning device for use with an X-ray machine comprising, a cassette storage compartment located adjacent and below the level of the exposure table, a plurality of resilient means and a platform for supporting cassettes within the said compartment tending to raise progressively to the top thereof, means for expelling the said cassettes contiguously from the top of the compartment by imparting an intermittent lateral thrust thereto, means for retaining the cassettes thus expelled from the said compartment in a predetermined stationary position during exposure and for releasing the said cassette therefrom after the exposure has been completed, and means operable to prevent the operation of the said X-ray machine until each of the said cassettes is brought to rest in the said predetermined exposure position.

8. A high capacity photographic magazine and exposure positioning device for use in rapid sequence X-ray photography comprising an X-ray cassette storage compartment located adjacent to and below the level of the exposure table, a plurality of resilient means tending to raise a platform and the cassette supported thereon within the said compartment progressively to the top thereof, means for removing the said cassette contiguously, laterally in the loaded position and in sequence from the top of the said storage compartment at a predetermined rapid rate, means for interrupting the lateral movement of the cassette thus removed from the said compartment during the exposure thereof and for releasing the exposed cassette from the device at the conclusion of the exposure.

9. Apparatus of the character described, comprising an enclosure, a platform mounted therein for vertical, reciprocal movement between a lower loaded position and an upper unloaded position, means supporting the platform and urging it upwardly in proportion to the load carried thereby, and rotary means for contiguously unloading cassettes carried by the platform, said rotary means having cam assemblies operable to engage the trailing edge of and impart linear movement to the topmost cassette in the loaded position.

10. Apparatus of the character described, comprising an enclosure, a platform mounted therein for vertical, reciprocal movement between a lower loaded position and an upper unloaded position, means supporting the platform and urging it upwardly in proportion to the load carried thereby, and rotary torsion drive means for contiguously unloading cassettes carried by said platform, said drive means having cam assemblies operable to slide the topmost cassette out of said enclosure in the loaded position and into an exposure chamber and being also operable to exert a force on said cassette proportional to the resistance offered thereby.

11. Apparatus of the character described, comprising an enclosure, a platform mounted therein for vertical, reciprocal movement between a lower loaded position and an upper unloaded position, means supporting the platform and urging it upwardly in proportion to the load carried thereby, rotary torsion drive means for contiguously unloading cassettes carried by said platform, said drive means being operable to slide the topmost cassette out of said enclosure and into an exposure chamber in the loaded position and being also operable to exert a force on said cassette proportional to the resistance offered thereby, said rotary drive means being also operable to impart linear movement to said cassettes, and means cooperating with said cassettes in the exposure chamber to prevent lateral movement during exposure.

12. Exposure apparatus of the character described, comprising an X-ray tube or the like and an exposure chamber; support means within said chamber for supporting a cassette in an exposure position in relation to said tube, said support means being shiftable between a supporting position and a non-supporting position to drop an exposed cassette; a circuit for said tube including an automatic exposure timer operable to de-energize said circuit and tube after a predetermined exposure, and a normally open master switch also operable to de-energize said circuit; means operable in response to movement of a cassette to exposure position, to close said master switch and thereby initiate operation of said tube; and means for operating said support means, said means being operable during exposure to maintain the support means in supporting position, to shift the support means to non-supporting position when exposure is terminated by said timer, and immediately thereafter to return the support means to supporting position in readiness for the next cassette.

13. Exposure apparatus of the character described, comprising an X-ray tube or the like, and an exposure chamber; support means within said chamber for supporting a cassette in an exposure position in relation to said tube, said support means being normally in supporting position but being shiftable to a non-supporting position for dropping an exposed cassette; electrically operated means for shifting said support means to non-supporting position; a tube circuit for said tube including an automatic exposure timer operable to automatically de-energize the tube after a predetermined exposure, and a normally open master switch also operable to open and close said circuit; means operable in response to movement of a cassette to exposure position for closing said master switch; a control circuit for said electrically operated means; means responsive to opening and closing of said tube circuit for automatically opening said control circuit during exposure and for automatically closing it on termination of the exposure to drop the exposed cassette; and means operated by said cassette to reopen the control circuit when the exposed cassette has dropped.

14. Exposure apparatus of the character described, comprising an X-ray tube or the like and an exposure chamber; support means in said chamber for supporting a cassette in an exposure position in relation to said tube, said support means being normally maintained in a supporting position but being shiftable to a non-supporting position for dropping an exposed cassette; relay means operable when energized to shift said support means to non-supporting position; a tube circuit for said tube including an automatic exposure timer operable to automatically de-energize the tube after a predetermined exposure, and a normally open master switch operable to open and close said circuit; means operable in response to movement of a cassette to exposure position for closing said master switch; a control circuit for said relay means and first and second relay operated switches in said control circuit, said first switch being normally closed and being opened during exposure, said second switch being normally open and being urged to closed position by its relay during exposure; and means operated by said cassette for opening said second switch when an exposed cassette is dropped from exposure position.

WALTER B. SNOOK.
RUOLF A. ISENBERG.

References Cited in the file of this patent

UNITED STATES PATENTS

| Number | Name | Date |
|---|---|---|
| 1,003,533 | Spery | Sept. 19, 1911 |
| 1,651,707 | Irwig | Dec. 6, 1927 |
| 1,682,931 | Pifer | Sept. 4, 1928 |
| 2,107,825 | Humphreys | Feb. 8, 1938 |
| 2,239,219 | Carl | Apr. 22, 1941 |
| 2,357,674 | McConnell et al. | Sept. 5, 1944 |
| 2,493,976 | Klemm et al. | Jan. 10, 1950 |

FOREIGN PATENTS

| Number | Country | Date |
|---|---|---|
| 547,943 | Great Britain | Sept. 18, 1942 |
| 754,853 | France | Sept. 4, 1933 |